July 17, 1928.
W. R. BARNEY
1,677,264
METHOD OF MAKING CLAMPS
Filed March 23, 1925
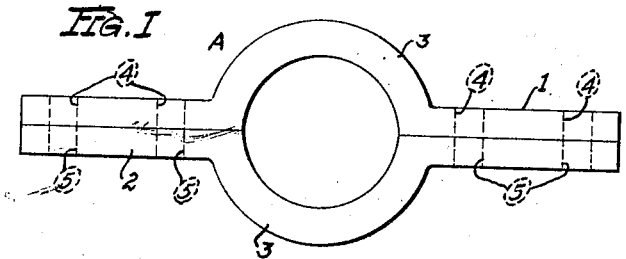
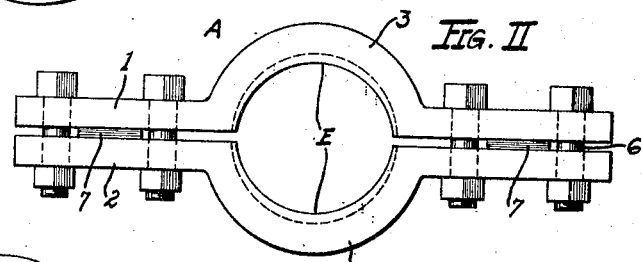
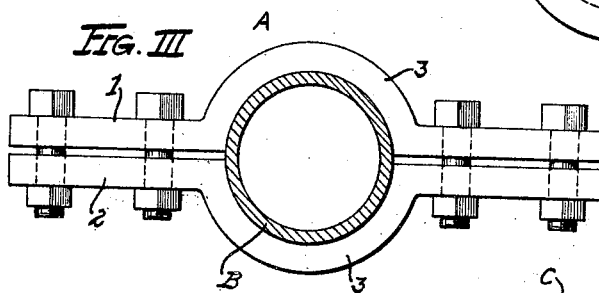
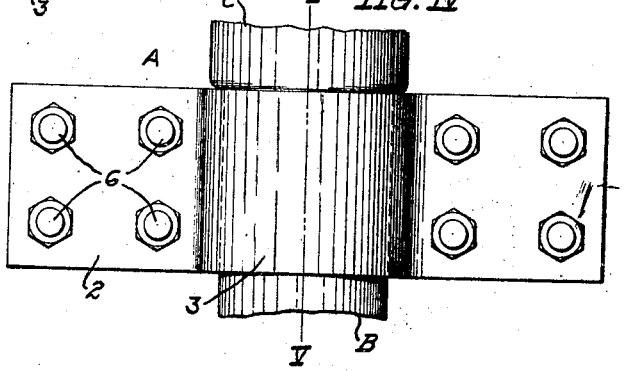
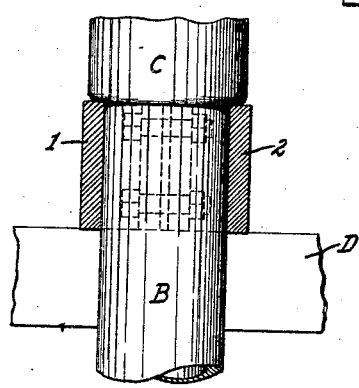
INVENTOR
Wᵐ R. BARNEY
BY Cook & McCauley
ATTORNEYS Patented July 17, 1928.

1,677,264

UNITED STATES PATENT OFFICE.

WILLIAM R. BARNEY, OF TULSA, OKLAHOMA, ASSIGNOR TO W. C. NORRIS, OF TULSA, OKLAHOMA.

METHOD OF MAKING CLAMPS.

Application filed March 23, 1925. Serial No. 17,682.

This invention relates generally to methods of making clamps, and particularly to a method of producing an improved anchor and casing or tubing clamp of the type used in oil wells for supporting the casing or tubing of said oil wells.

Prior to this invention clamps of the type disclosed herein were so produced that rather rough and unfinished articles resulted, said clamps being made with very little concern as to exact fits between said clamps and the articles with which they were to be associated. In other words, if the condition of a clamp of the type heretofore used was such that merely an approximate fit was obtained between said clamp and the casing or tubing with which it was used, this was considered sufficient.

As stated above clamps of the type disclosed herein are used for supporting casings or tubings in oil wells, said clamps being usually arranged immediately beneath casing collars associated with the casings. The clamps are adapted to frictionally grip the casing or tubing with which they are associated, and also because of the location of said clamps immediately beneath the casing collars a positive seat is provided for said casing collar. The casing collars mentioned are so produced that they are provided with rounded corners at the points where the annular side faces of said casing collars meet the top and bottom faces thereof. As stated above the clamps are usually arranged immediately beneath casing collars on the supporting casings or tubing and because of the comparatively loose fit of the clamps heretofore used with respect to the casing or tubing there was a tendency for the more or less tapering bottom faces of the casing collars to be forced into the openings within the clamps. The result of this was that the great weight of the casing or tubing either caused said casing or tubing to slip through the clamp or the strain caused by the casing collar being forced through the clamp resulted in the bolts of the clamp being sheared.

To eliminate the trouble encountered in connection with the clamps heretofore used, I have devised the clamp disclosed herein which is so made and so arranged on the casing or tubing with which it is associated that a very firm frictional grip is obtained on the casing or tubing and also said clamps are provided with smooth faces which provide very positive seats for the casing collars and for the clamp itself.

Fig. I is a plan view of the associated elements of one of my improved clamps showing the same in their original rough form before they have been finished.

Fig. II illustrates the elements shown in Fig. I as they will appear when they are arranged for the final finishing operations.

Fig. III is a cross section of a casing or tubing showing a clamp associated therewith, said clamp being shown in plan.

Fig. IV is a side elevation of the clamp shown in Fig. III together with a fragment of a casing or tubing.

Fig. V is a section on the line V—V of Fig. IV but showing the fragment of the casing or tubing in elevation.

In the drawing A designates my improved clamp which comprises a pair of clamping members 1 and 2. The clamping members 1 and 2 are each provided with an outwardly bowed portion 3 which when arranged in cooperation with each other provide a circular space E through which the article clamped passes. The clamping member 1 is provided with apertures 4 which are adapted to be arranged in registration with similar apertures 5 formed through the clamping member 2 and 6 designates bolts which are extended through the registering apertures of the assembled clamp whereby the clamping members 1 and 2 may be drawn together. B designates a fragment of a casing or tubing of the type used in oil wells which casing or tubing is provided with the ordinary casing collar C. In Fig. V, D designates a fragment of a derrick sill, or other element by which the clamp is supported.

It will be seen from the drawing that the clamp A is so arranged on the casing or tubing B that the lower face of a casing collar C rests upon the top face of said clamp (Figs. IV and V). In accordance with this arrangement the clamp is caused to frictionally grip the casing or tubing when the members 1 and 2 are drawn together by the bolts 6 and said clamp also provides a seat for the casing collar C whereby the casing or tubing is supported. The casing or tubing B is usually of considerable height and consequently of great weight, and if said casing or tubing is to be properly supported by the clamp so that it will not slip relative to said clamp very firm and positive frictional contact must be obtained between the clamp and the casing or tubing B and also a very positive seat for the casing collar C must be provided. The clamp disclosed in the present application is so constructed that the desirable frictional grip and the necessary positive seat are provided and the manner in which said clamp is produced will now be described.

The clamping members 1 and 2 of the clamp are formed in any suitable manner, such for instance, as by forging, and when so formed, said clamping members present a rather rough and unfinished appearance. In order to insure firm frictional contact between the wall of the circular spaces E within the outwardly bowed portions 3 of the members 1 and 2 and the outside face of the casing or tubing B, I form the clamping members 1 and 2 so that when the associated members are arranged together said circular space E will be of less diameter than the casing or tubing on which the clamp is to be used. The associated clamping members 1 and 2 are then arranged as shown in Fig. II, that is, the members 1 and 2 are spaced apart from each other a short distance by spreaders 7 and the bolts 6 are passed through the registering apertures in said members and are provided with suitable nuts. After the members 1 and 2 have been drawn together by the bolts 6 as closely as the spreader 7 will permit, the circular space E is machined out until it is the exact diameter of the casing or tubing with which the clamp is to be used. It is apparent from this that when the spreaders 7 are removed from between the clamping members 1 and 2 as they will be when the clamp is in use, the bolts 6 will be capable of drawing the clamping members 1 and 2 together so that they will very tightly grip the casing or tubing on which the clamp is used.

In addition to machining the circular space E I also machine the top and bottom faces of the clamp along its entire length. The object of this operation is to provide the bottom face of the clamp with an absolutely smooth surface which will firmly contact with the element by which the clamp is supported and I machine the top face of the clamp to provide an absolutely square shoulder on which the casing collar will rest (Fig. V) so that there will be no opportunity for the casing collar to force itself into the clamp.

It is apparent from the foregoing that a clamp is provided which will grip the casing or tubing with sufficient firmness to prevent movement of said casing or tubing relative to said clamp, and in addition to this said clamp is provided with a seat for a casing collar associated with the casing or tubing which seat will very positively support said casing collar and eliminate any likelihood that the casing collar will force itself into the clamp.

I claim:

The method of producing clamps for the support of oil well pipes which comprises forming recesses, smaller than the pipe to be supported, in the inner faces of the clamping members, placing spreaders between said members, machining said inner faces so that spaces of exactly the same diameter as the pipe are provided, then removing said spreaders, and machining the top and bottom faces of said clamping members.

In testimony that I claim the foregoing I hereunto affix my signature.

WILLIAM R. BARNEY.